United States Patent
Han et al.

(10) Patent No.: US 10,691,231 B2
(45) Date of Patent: Jun. 23, 2020

(54) TOUCH PANEL AND DISPLAY DEVICE INCLUDING THE SAME

(71) Applicant: SAMSUNG DISPLAY CO., LTD., Yongin-Si, Gyeonggi-Do (KR)

(72) Inventors: Jeongyun Han, Hwaseong-si (KR); Gwangbum Ko, Suwon-si (KR); Hyunjae Na, Seoul (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 15/629,374

(22) Filed: Jun. 21, 2017

(65) Prior Publication Data
US 2018/0039349 A1   Feb. 8, 2018

(30) Foreign Application Priority Data
Aug. 2, 2016 (KR) .................. 10-2016-0098547

(51) Int. Cl.
*G06F 3/041* (2006.01)
*G06K 9/00* (2006.01)
*G06F 3/044* (2006.01)

(52) U.S. Cl.
CPC ............ *G06F 3/041* (2013.01); *G06F 3/0412* (2013.01); *G06K 9/0002* (2013.01); *G06K 9/00087* (2013.01); *G06F 3/044* (2013.01); *G06F 2203/04111* (2013.01)

(58) Field of Classification Search
CPC combination set(s) only.
See application file for complete search history.

(56) References Cited

U.S. PATENT DOCUMENTS

| 6,108,438 A | * | 8/2000 | Bird ..................... G06K 9/0002 250/556 |
|---|---|---|---|
| 2011/0175846 A1 | | 7/2011 | Wang et al. |
| 2012/0105081 A1 | | 5/2012 | Shaikh et al. |
| 2012/0182253 A1 | | 7/2012 | Brosnan |
| 2014/0369574 A1 | | 12/2014 | Shie et al. |
| 2015/0138151 A1 | | 5/2015 | Moran et al. |

(Continued)

FOREIGN PATENT DOCUMENTS

| CN | 104881196 A | 9/2015 |
|---|---|---|
| JP | 2006-14838 | 1/2006 |
| KR | 10-2011-0127236 A | 11/2011 |

(Continued)

OTHER PUBLICATIONS

Touch Sensing Structure of Electronic Device Nov. 2015 applicants Yang, Heui ,Bong WO / 2015083959 (Year: 2015).*

(Continued)

*Primary Examiner* — Van N Chow
(74) *Attorney, Agent, or Firm* — Innovation Counsel LLP

(57) ABSTRACT

A touch panel includes: a substrate including a touch recognition area and a fingerprint recognition area; a first driving electrode and a first sensing electrode insulated from each other on the substrate and each positioned in the touch recognition area; and a second driving electrode and a second sensing electrode insulated from each other on the substrate and each positioned in the fingerprint recognition area. At least one of the second driving electrode and the second sensing electrode includes: a stem portion; and a branch portion branching off from the stem portion.

29 Claims, 15 Drawing Sheets

(56) References Cited

U.S. PATENT DOCUMENTS

2016/0364593 A1    12/2016   Lee et al.
2017/0147850 A1    5/2017   Liu et al.

FOREIGN PATENT DOCUMENTS

| KR | 10-2012-0138887 A | 12/2012 |
| KR | 10-1474733 B1 | 12/2014 |
| KR | 10-1502326 B1 | 3/2015 |
| KR | 10-2015-0087811 A | 7/2015 |
| TW | M513411 U | 12/2015 |
| WO | 2015083959 A1 | 6/2015 |

OTHER PUBLICATIONS

Extended European Search Report for Application No. 17184110.9, dated Nov. 23, 2017, pp. 1-7.

\* cited by examiner

TOUCH PANEL AND DISPLAY DEVICE INCLUDING THE SAME

CROSS-REFERENCE TO RELATED APPLICATION

This application claims priority under 35 U.S.C. § 119 to Korean Patent Application No. 10-2016-0098547 filed on Aug. 2, 2016 in the Korean Intellectual Property Office (KIPO), the disclosure of which is incorporated by reference herein in its entirety.

1. TECHNICAL FIELD

Exemplary embodiments of the present invention relate generally to touch panels, and more particularly to touch panels having a fingerprint recognition function and display devices including the touch panels.

2. DISCUSSION OF RELATED ART

In recent times, various functions have been added to display devices in addition to their image representation function. For example, display devices may now include a fingerprint recognition sensor.

Fingerprint recognition sensors may be classified into capacitive type, optical type, thermal type, and ultrasonic type sensors, for example. The capacitive type fingerprint recognition sensor recognizes a fingerprint based on a capacitance difference in accordance with a distance between a ridge of the fingerprint and a valley of the fingerprint, which is sensed by finely disposed sensing electrodes.

Conventional display devices include a display panel, a touch panel on the display panel, a fingerprint recognition sensor on the touch panel, and a cover glass on the fingerprint recognition sensor. As such, since a fingerprint recognition sensor is separately provided to recognize fingerprints, an additional process is required and a thickness of the display devices increases.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments of the present invention may be directed to a touch panel having a fingerprint recognition function without a separate fingerprint recognition sensor and to a display device including the touch panel.

According to an exemplary embodiment of the present invention, a touch panel includes: a substrate including a touch recognition area and a fingerprint recognition area; a first driving electrode and a first sensing electrode insulated from each other on the substrate and each positioned in the touch recognition area; and a second driving electrode and a second sensing electrode insulated from each other on the substrate and each positioned in the fingerprint recognition area. At least one of the second driving electrode and the second sensing electrode includes: a stem portion; and a branch portion branching off from the stem portion.

The touch panel may further include an auxiliary branch portion branching off from the branch portion.

The stem portion may have a zig-zag shape.

The second driving electrode and the second sensing electrode may further include an auxiliary branch portion bent from the branch portion to extend therefrom.

The second driving electrode and the second sensing electrode may each have a zig-zag shape.

Adjacent ones of the branch portions may be connected to one another.

An area of the fingerprint recognition area may be substantially an integer multiple of an area of the first driving electrode or an area of the first sensing electrode.

The first driving electrode or the first sensing electrode may have an area having a magnitude from about several square millimeters ($mm^2$) to about several tens of square millimeters.

The second driving electrode and the second sensing electrode may have a pitch having a magnitude from about several micrometers ($\mu m$) to about several tens of micrometers.

According to an exemplary embodiment of the present invention, a touch panel includes: a substrate including a touch recognition area and a fingerprint recognition area; a first driving electrode and a first sensing electrode insulated from each other on the substrate and each positioned in the touch recognition area; and a second driving electrode and a second sensing electrode insulated from each other on the substrate and each positioned in the fingerprint recognition area. The second driving electrode and the second sensing electrode include: a plurality of unit electrodes; and a connecting wiring connecting the unit electrodes.

The unit electrodes may each have a shape selected from: a triangular shape, a quadrangular shape, and a lozenge shape.

The first driving electrode or the first sensing electrode may have an area having a magnitude from about several square millimeters ($mm^2$) to about several tens of square millimeters.

The unit electrode may have an area having a magnitude from about several tens of square micrometers ($\mu m^2$) to about several hundreds of square micrometers.

The touch panel may further include: a first routing wiring connected to the first driving electrode; a second routing wiring connected to the first sensing electrode; and a touch driving unit connected to the first routing wiring and the second routing wiring.

The touch panel may further include: a third routing wiring connected to the second driving electrode; a fourth routing wiring connected to the second sensing electrode; and a fingerprint recognition unit connected to the third routing wiring and the fourth routing wiring.

The touch driving unit and the fingerprint recognition unit may oppose each other.

The stem portion and the branch portion may have an included angle that is an angle between about 80 degrees and about 100 degrees.

The branch portion and the auxiliary branch portion may have an included angle that is an angle between about 80 degrees and about 100 degrees.

The auxiliary branch portion may be substantially parallel to the stem portion.

The fingerprint recognition area may be positioned at a central portion of at least one edge portion of the substrate.

According to an exemplary embodiment of the present invention, a display device includes: a display panel including a plurality of pixels configured to display an image; and a touch panel on the display panel. The touch panel includes: a first driving electrode and a first sensing electrode insulated from each other on the display panel and each positioned in a touch recognition area; and a second driving electrode and a second sensing electrode insulated from each other on the display panel and each positioned in a fingerprint recognition area. At least one of the second driving electrode and the second sensing electrode includes: a stem portion; and a branch portion branching off from the stem portion. The second driving electrode and the second sensing electrode are disposed proximate to a boundary of the plurality of pixels.

The display device may further include an auxiliary branch portion branching off from the branch portion.

The stem portion may have a zig-zag shape.

The second driving electrode and the second sensing electrode may further include an auxiliary branch portion bent from the branch portion to extend therefrom.

The second driving electrode and the second sensing electrode may have a zig-zag shape.

Adjacent ones of the branch portions may be connected to one another.

According to an exemplary embodiment of the present invention, a display device includes: a display panel including a plurality of pixels displaying an image; and a touch panel on the display panel. The touch panel includes: a first driving electrode on the display panel and positioned in a touch recognition area; a second driving electrode on the display panel and positioned in a fingerprint recognition area; a first insulating layer on the first driving electrode and the second driving electrode; an adhesion layer on the first insulating layer; a second insulating layer on the adhesion layer; a first sensing electrode on the second insulating layer and positioned in the touch recognition area; a second sensing electrode on the second insulating layer and positioned in the fingerprint recognition area; and a cover glass on the first sensing electrode and the second sensing electrode. At least one of the second driving electrode and the second sensing electrode includes: a stem portion; and a branch portion branching off from the stem portion. The second driving electrode and the second sensing electrode are disposed proximate to a boundary of the plurality of pixels.

The foregoing is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

A more complete appreciation of the present invention will become more apparent by describing in detail exemplary embodiments thereof with reference to the accompanying drawings, wherein.

DETAILED DESCRIPTION

Figure 1:
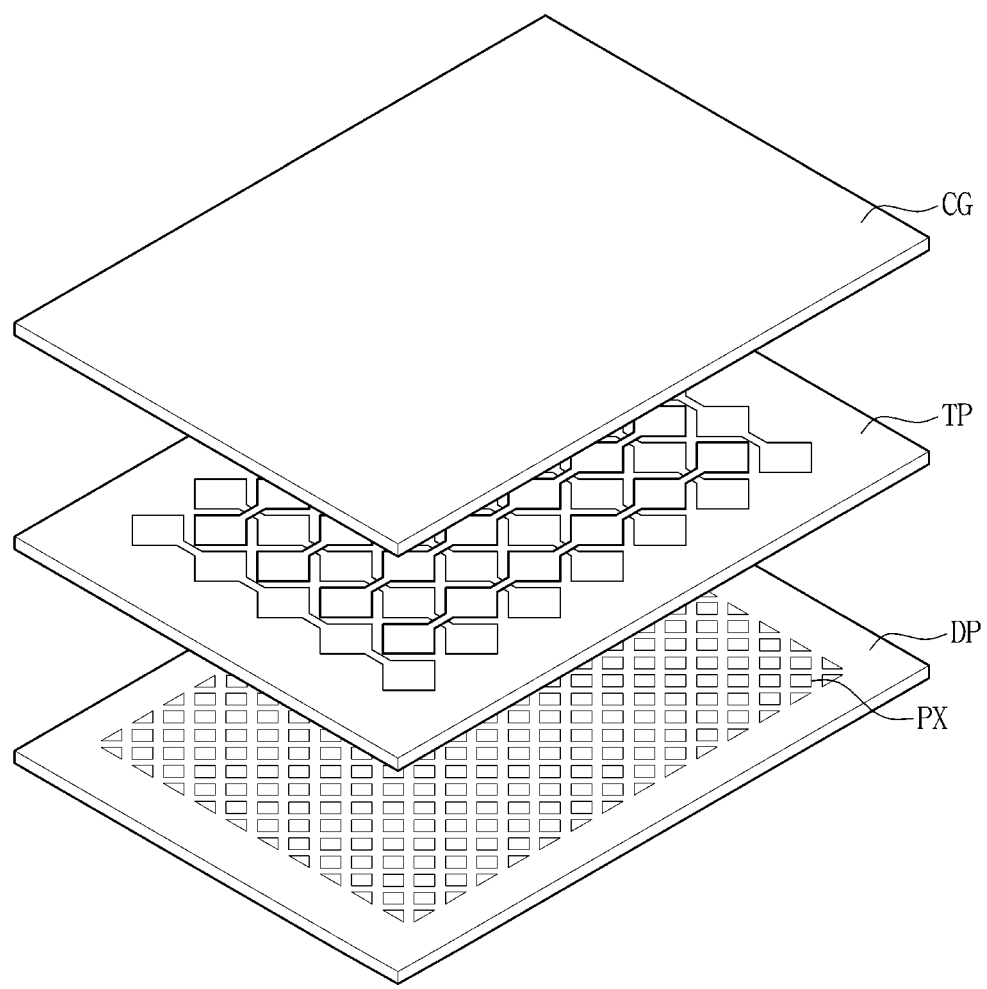
FIG. 1 is a schematic perspective view illustrating a display device according to a first exemplary embodiment.

Exemplary embodiments will now be described more fully hereinafter with reference to the accompanying drawings. Although the invention can be modified in various manners and have several embodiments, exemplary embodiments are illustrated in the accompanying drawings and will be mainly described in the specification. However, the scope of the invention is not limited to the exemplary embodiments and should be construed as including all the changes, equivalents, and substitutions included in the spirit and scope of the invention.

In the drawings, thicknesses of a plurality of layers and areas are illustrated in an enlarged manner for clarity and ease of description thereof. The various figures thus may not be to scale. When a layer, area, or plate is referred to as being "on" another layer, area, or plate, it may be directly on the other layer, area, or plate, or intervening layers, areas, or plates may be present therebetween. Conversely, when a layer, area, or plate is referred to as being "directly on" another layer, area, or plate, intervening layers, areas, or plates may be absent therebetween. Further when a layer, area, or plate is referred to as being "below" another layer, area, or plate, it may be directly below the other layer, area, or plate, or intervening layers, areas, or plates may be present therebetween. Conversely, when a layer, area, or plate is referred to as being "directly below" another layer, area, or plate, intervening layers, areas, or plates may be absent therebetween.

The spatially relative terms "below", "beneath", "less", "above", "upper", and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. It will be further understood that the terms "comprises," "comprising,"

"includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" can be termed likewise without departing from the teachings herein.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Some of the parts which are not associated with the description may not be provided in order to specifically describe embodiments of the present invention, and like reference numerals refer to like elements throughout the specification. All numerical values are approximate, and may vary. All examples of specific materials and compositions are to be taken as nonlimiting and exemplary only. Other suitable materials and compositions may be used instead.

Figure 2:
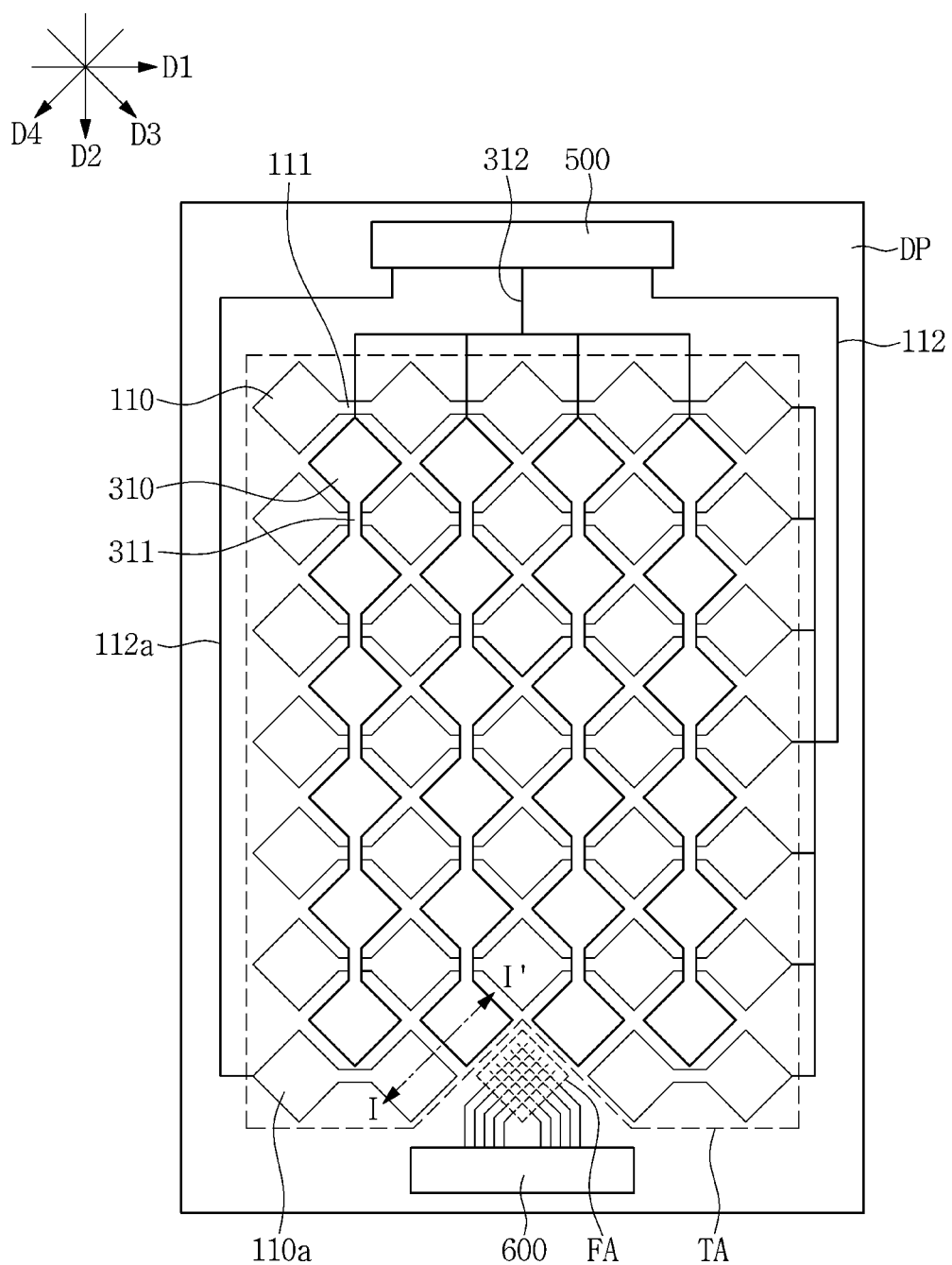
FIG. 2 is a plan view illustrating the display device according to the first exemplary embodiment.

FIG. 1 is a schematic perspective view illustrating a display device according to a first exemplary embodiment, and FIG. 2 is a plan view illustrating the display device according to the first exemplary embodiment.

Referring to FIGS. 1 and 2, the display device according to the first exemplary embodiment includes a display panel DP including a plurality of pixels PX that display images, a touch panel TP on the display panel DP, and a cover glass CG on the touch panel TP.

The display panel DP according to the first exemplary embodiment may be one of: a liquid crystal display (LCD) panel, an organic light emitting diode (OLED) display panel, a plasma display panel (PDP), and an electrophoretic display (EPD) panel.

The display panel DP may include the plurality of pixels PX that are arranged in a matrix form. According to the first exemplary embodiment, each pixel PX is depicted as having substantially a lozenge shape (i.e. a square that may have rounded corners), but exemplary embodiments are not limited thereto. The pixel PX may have various other shapes such as any substantially quadrangular shape or any substantially triangular shape.

In addition, the pixel PX according to the first exemplary embodiment is depicted as including a red pixel, a green pixel, and a blue pixel, but exemplary embodiments are not limited thereto, and the pixel PX may be at least one selected from the group consisting of red, green, blue, cyan, magenta, yellow, and white pixels, or any other desired color.

The display panel DP may include a touch recognition area TA and a fingerprint recognition area FA from a plane. The fingerprint recognition area FA according to the first exemplary embodiment may be positioned at a central portion of at least an edge portion of the display panel DP in plan view. However, exemplary embodiments are not limited thereto, and the fingerprint recognition area FA may be any predetermined area or areas on the display panel DP. As shown, the touch recognition area TA may correspond to most or all of the area of the display panel DP besides the fingerprint recognition area FA.

The first exemplary embodiment is described under the assumption that the touch panel TP is an on-cell type touch panel, i.e., a touch panel that is directly disposed on the display panel DP without a separate substrate, but exemplary embodiments are not limited thereto. In an alternative exemplary embodiment, the touch panel TP may be an in-cell type touch panel, i.e., a touch panel that is formed on a separate substrate and then disposed on the display panel DP or formed in the display panel DP.

In addition, it is assumed that the touch panel TP according to the first exemplary embodiment has a structure in which a driving electrode and a sensing electrode for measuring a capacitance are disposed on different layers, respectively, but exemplary embodiments are not limited thereto. In an alternative exemplary embodiment, the touch panel TP may have a structure in which the sensing electrodes for measuring a capacitance are disposed on substantially a same layer and are, for example, separated by a bridge electrode.

Figure 3:
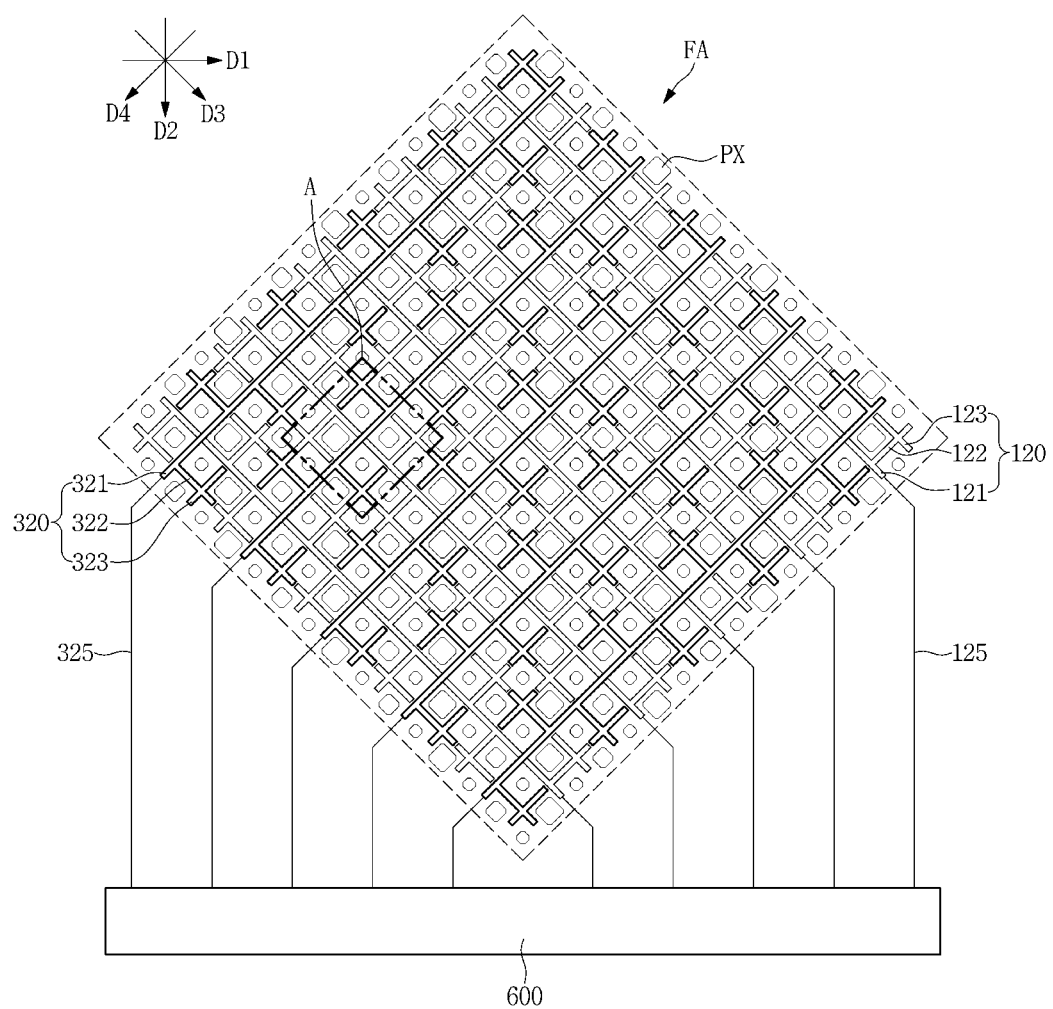
FIG. 3 is a plan view illustrating further details of a fingerprint recognition area of FIG. 2.
Figure 4:
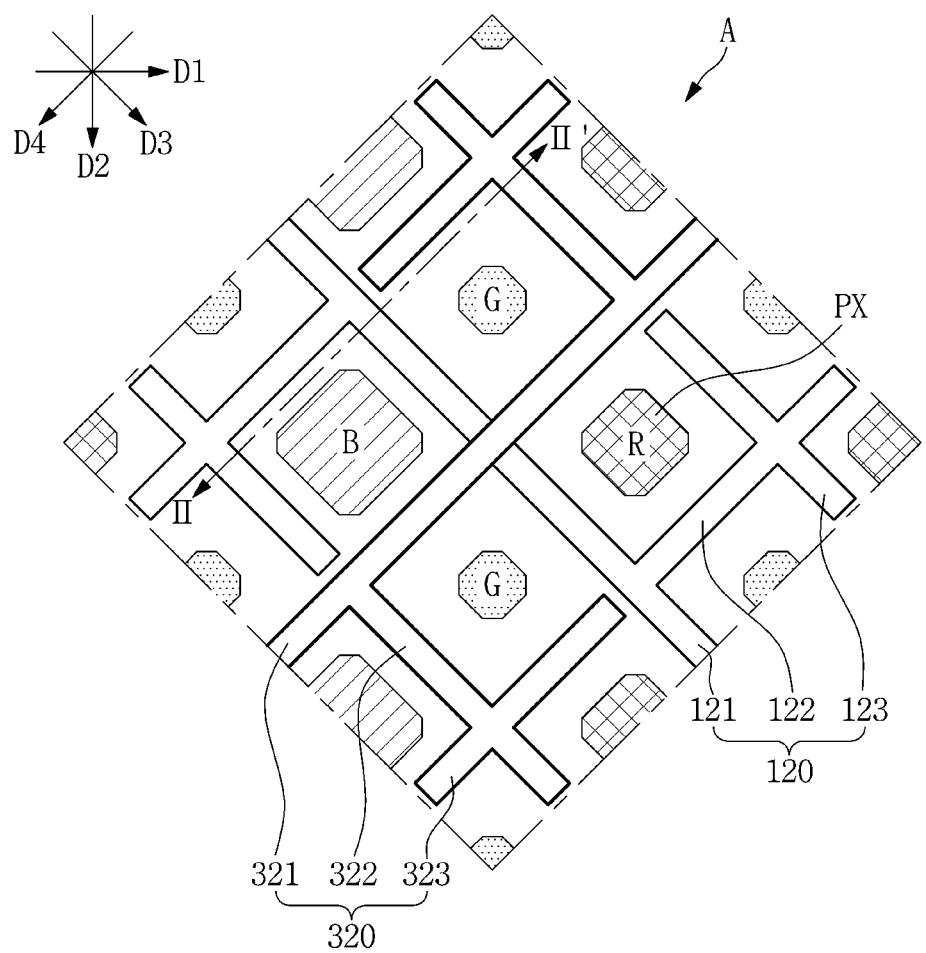
FIG. 4 is an enlarged view illustrating further details of an area "A" of FIG. 3.
Figure 5:
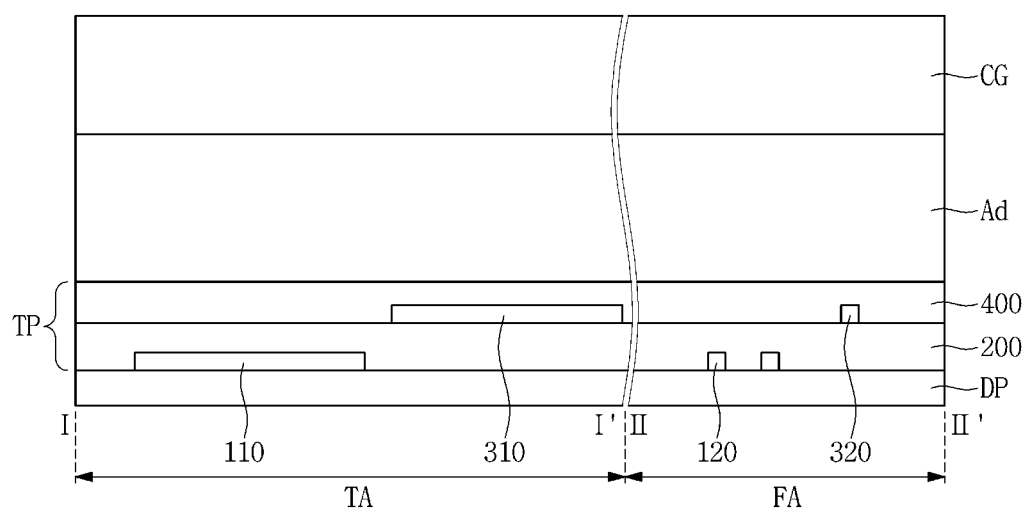
FIG. 5 is a cross-sectional view taken along line I-I' of FIG. 2 and line II-II' of FIG. 4.

FIG. 3 is a plan view illustrating further details of a fingerprint recognition area of FIG. 2, FIG. 4 is an enlarged view illustrating further details of an area "A" of FIG. 3, and FIG. 5 is a cross-sectional view taken along line I-I' of FIG. 2 and line II-II' of FIG. 4.

Referring to FIGS. 1, 2, 3, 4, and 5, the display device according to the first exemplary embodiment includes the display panel DP, a plurality of first driving electrodes 110 on the display panel DP in the touch recognition area TA, a plurality of second driving electrodes 120 on the display panel DP in the fingerprint recognition area FA, a first insulating layer 200 on the display panel DP and over the first driving electrode 110 and the second driving electrode 120, a plurality of first sensing electrodes 310 on the first insulating layer 200 in the touch recognition area TA, a plurality of second sensing electrodes 320 on the first insulating layer 200 in the fingerprint recognition area FA, a second insulating layer 400 on the first insulating layer 200 and over the first sensing electrode 310 and the second sensing electrode 320, an adhesion layer Ad on the second insulating layer 400, and a cover glass CG on the adhesion layer Ad.

In the drawings, the first driving electrode 110 and the first sensing electrode 310 according to the first exemplary embodiment are depicted as including a planar or flat electrode having a lozenge shape, but exemplary embodiments are not limited thereto. In an alternative exemplary embodiment, the first driving electrode 110 and the first sensing electrode 310 may each individually have a triangular shape, a quadrangular shape, or a mesh electrode shape.

The first driving electrode 110 and the first sensing electrode 310 may have sizes suitable to detect a touch input based on size and purpose of use of the display device. For example, the first driving electrode 110 and the first sensing electrode 310 may each have an area ranging from about several square millimeters ($mm^2$) to about several tens of square millimeters.

In the display device according to the first exemplary embodiment, the fingerprint recognition area FA is depicted as having substantially a same area as an area of one of a single first driving electrode 110 or a single first sensing electrode 310, but exemplary embodiments are not limited thereto. In an alternative exemplary embodiment, an area of the fingerprint recognition area FA may be an integer multiple (about two to about five times) of an area of a single first driving electrode 110 or a single first sensing electrode 310, or may have any other suitable value based on the size of the display device.

The first driving electrode 110 may extend in, e.g., a first direction D1, and adjacent ones of the first driving electrodes 110 may be electrically connected to one another by a first connecting wiring 111.

The first sensing electrode 310 may extend in, e.g., a second direction D2 which intersects the first direction D1, and adjacent ones of the first sensing electrodes 310 may be electrically connected to one another by a second connecting wiring 311.

The first connecting wiring 111 and the second connecting wiring 311 may be insulated from, and intersect, each other in plan view.

The first driving electrode 110 and the first sensing electrode 310 may be disposed so as not to overlap each other in plan view.

The first driving electrode 110 and the first sensing electrode 310 may include a metal or transparent conductive oxide (TCO). The TCO may include at least one selected from the group consisting of: indium tin oxide (ITO), indium zinc oxide (IZO), zinc oxide (ZnO), carbon nanotube (CNT), and graphene.

The first driving electrode 110 may be electrically connected to a first routing wiring 112, and the first sensing electrode 310 may be electrically connected to a second routing wiring 312. The first routing wiring 112 and the second routing wiring 312 may be connected to a touch driving unit 500.

In FIG. 2, a separate first routing wiring 112a may further be provided to connect the touch driving unit 500 to a first driving electrode 110a that is separated from the touch driving unit 500 by the fingerprint recognition area FA.

The touch driving unit 500 inputs a driving signal to the first driving electrode 110, and may verify the presence of a touch input, and its touch coordinates, based on a capacitance variation or a voltage variation measured by the first sensing electrode 310.

The touch driving unit 500 may be directly disposed on the display panel DP as an integrated circuit (IC) or may be provided in a different configuration. The touch driving unit 500 may be disposed on the display panel DP to oppose a fingerprint recognition unit 600 to be described below.

For example, in a case where the touch driving unit 500 is disposed at an upper portion of the display panel DP in the plan view of FIG. 2, the fingerprint recognition unit 600 may be disposed at a lower portion of the display panel DP. Similarly, in a case where the touch driving unit 500 is disposed at a lower portion of the display panel DP in the view of FIG. 2, the fingerprint recognition unit 600 may be disposed at an upper portion of the display panel DP.

The cover glass CG may include or be formed of at least one selected from: glass, sapphire, diamond, polymethylmethacrylate (PMMA), and polycarbonate (PC). The adhesion layer Ad may include a transparent adhesive material. For example, the adhesion layer Ad may be an optical clear resin.

Referring to FIGS. 3 and 4, the second driving electrode 120 according to the first exemplary embodiment may include a first stem portion 121 extending in a third direction D3, a plurality of first branch portions 122 branching off from the first stem portion 121 in a fourth direction D4 which intersects the third direction D3, and a first auxiliary branch portion 123 branching off from the first branch portion 122 in the third direction D3.

The first stem portion 121 may include a plurality of stem portions along the fourth direction D4.

The plurality of first branch portions 122 may branch off from a point of the first stem portion 121 in opposite directions or in one direction. In an alternative exemplary embodiment, the plurality of first branch portions 122 may branch off from multiple points of the first stem portion 121 in opposite directions or in one direction.

Referring to FIGS. 3 and 4, the plurality of first branch portions 122 according to the first exemplary embodiment may branch off from multiple points of the first stem portion 121 in one direction and then another direction in alternating manner.

The first auxiliary branch portions 123 may branch off from the first branch portion 122 in opposite directions or in one direction. Referring to FIGS. 3 and 4, the first auxiliary branch portions 123 according to the first exemplary embodiment may branch off from the first branch portion 122 in opposite directions.

The first stem portion 121 and the first branch portion 122 may have an included angle ranging from about 80 degrees to about 100 degrees. For example, the first stem portion 121 and the first branch portion 122 may have an included angle that is substantially about 90 degrees.

In addition, the first branch portion 122 and the first auxiliary branch portion 123 may form an included angle ranging from about 80 degrees to about 100 degrees. For example, the first branch portion 122 and the first auxiliary branch portion 123 may form an included angle that is substantially about 90 degrees.

The first stem portion 121 and the first auxiliary branch portion 123 may be substantially parallel to each other.

The second sensing electrode 320 may include a second stem portion 321 extending in the fourth direction D4, a plurality of second branch portions 322 branching off from the second stem portion 321 in the third direction D3, and a second auxiliary branch portion 323 branching off from the second branch portion 322 in the fourth direction D4.

The second stem portion 321 may include a plurality of stem portions branching out along the third direction D3.

The plurality of second branch portions 322 may branch off from a point of the second stem portion 321 in opposite directions or in one direction. In an alternative exemplary embodiment, the plurality of second branch portions 322 may branch off from multiple points of the second stem portion 321 in opposite directions or in one direction.

Referring to FIGS. 3 and 4, the plurality of second branch portions 322 according to the first exemplary embodiment may branch off from multiple points of the second stem portion 321 in one direction and then another direction in alternating manner.

The second auxiliary branch portion 323 may branch off from a point of the second branch portion 322 in opposite directions or in one direction. Referring to FIGS. 3 and 4, the second auxiliary branch portion 323 according to the first exemplary embodiment may branch off from a point of the second branch portion 322 in opposite directions.

The second stem portion 321 and the second branch portion 322 may have an included angle ranging from about 80 degrees to about 100 degrees. For example, the second stem portion 321 and the second branch portion 322 may have an included angle that is substantially about 90 degrees.

In addition, the second branch portion 322 and the second auxiliary branch portion 323 may form an included angle ranging from about 80 degrees to about 100 degrees. For example, the included angle between the second branch portion 322 and the second auxiliary branch portion 323 may be substantially about 90 degrees.

The second stem portion 321 and the second auxiliary branch portion 323 may be substantially parallel to each other.

The second driving electrode 120 and the second sensing electrode 320 may be disposed at a boundary area of the plurality of pixels PX. That is, the second driving electrode 120 and the second sensing electrode 320 may be disposed to enclose each of the pixels PX in plan view.

For example, referring to FIG. 4, each of four pixels R-G-B-G forming one unit pixel may be (partially) enclosed or surrounded by the first stem portion 121, the first branch portion 122, the first auxiliary branch portion 123, the second stem portion 321, the second branch portion 322, and the second auxiliary branch portion 323 in plan view.

A line width and a pitch of the second driving electrode 120 and the second sensing electrode 320 may be significantly small, e.g., about several micrometers (μm) to about several tens of micrometers.

Based on a density of the second driving electrode 120 and the second sensing electrode 320, accuracy of fingerprint sensing with respect to the fingerprint recognition area FA may vary.

The second driving electrode 120 and the second sensing electrode 320 may include a metal or transparent conductive oxide (TCO). The TCO may include at least one selected from: indium tin oxide (ITO), indium zinc oxide (IZO), zinc oxide (ZnO), carbon nanotube (CNT), and graphene.

The second driving electrode 120 may be electrically connected to a third routing wiring 125, and the second sensing electrode 320 may be electrically connected to a fourth routing wiring 325. The third routing wiring 125 and the fourth routing wiring 325 may be connected to the fingerprint recognition unit 600.

The fingerprint recognition unit 600 may input a driving signal to the second driving electrode 120 and may recognize a fingerprint based on a capacitance variation or a voltage variation measured by the second sensing electrode 320.

For example, when a touch action is performed to the fingerprint recognition area FA for a predetermined time or longer, the fingerprint recognition unit 600 may recognize the touching fingerprint and generate fingerprint information.

A fingerprint is a raised wrinkle on the last joint of human fingers, and includes ridges as well as valleys between the ridges. That is, when a finger contacts the fingerprint recognition area FA, the ridges contact the fingerprint recognition area FA, but the valleys do not. That is, coordinates of varying capacitance measured by the second sensing electrode 320 correspond to the ridges, and coordinates of unvarying capacitance correspond to the valleys. A fingerprint may be recognized in such a manner.

The fingerprint recognition unit 600 may be directly disposed on the display panel DP in the form of an integrated circuit, or may be provided as a separate element.

The second driving electrode 120 and the second sensing electrode 320 according to the first exemplary embodiment respectively include the first and second branch portions 122 and 322 respectively branching off from the first and second stem portions 121 and 321, and the auxiliary branch portions 123 and 323, such that a mutual capacitance that occurs between the second driving electrode 120 and the second sensing electrode 320 may be increased. Accordingly, sensitivity of the fingerprint recognition unit 600 may be improved.

In addition, the second driving electrode 120 and the second sensing electrode 320 according to an exemplary embodiment are disposed on a boundary area of the plurality of pixels PX in plan view, and thus a decrease in light transmittance may be minimized.

Hereinafter, a display device according to other exemplary embodiments will be described. Redundant descriptions pertaining to the above-described configurations of the first exemplary embodiment will be omitted in descriptions pertaining to configurations of the other exemplary embodiments.

Figure 6:
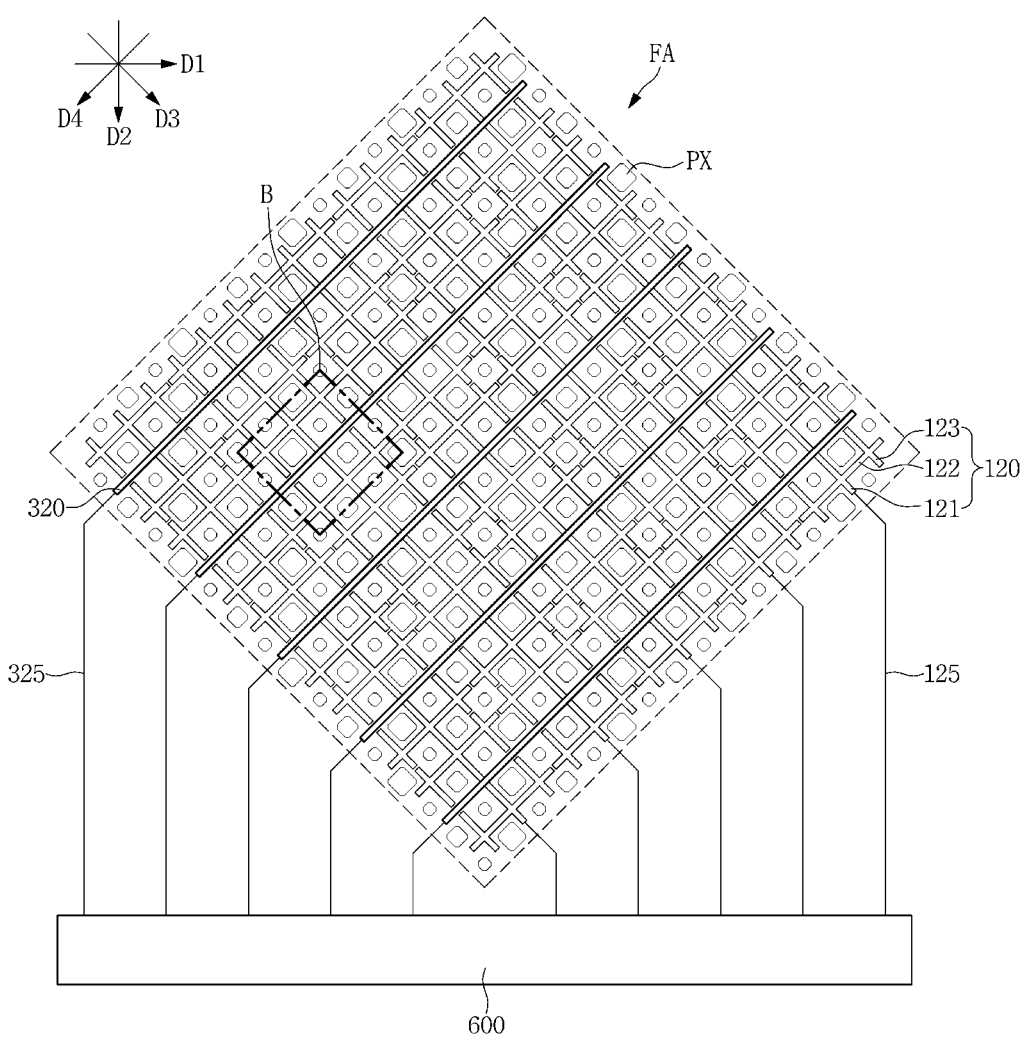
FIG. 6 is a plan view illustrating a fingerprint recognition area according to a second exemplary embodiment.
Figure 7:
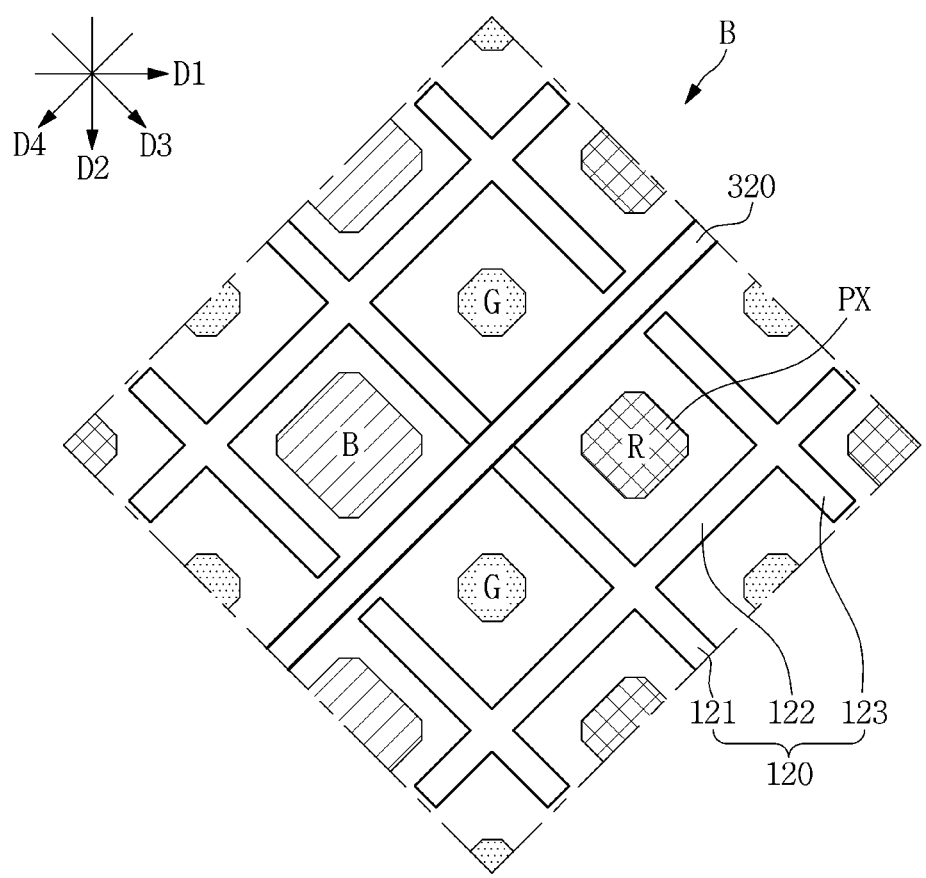
FIG. 7 is an enlarged view illustrating further details of an area "B" of FIG. 6.

FIG. 6 is a plan view illustrating a fingerprint recognition area FA according to a second exemplary embodiment, and FIG. 7 is an enlarged view illustrating further details of an area "B" of FIG. 6.

Referring to FIGS. 6 and 7, a second driving electrode 120 according to the second exemplary embodiment may include a first stem portion 121 extending in a third direction D3, a plurality of first branch portions 122 branching off from the first stem portion 121 in a fourth direction D4 which intersects the third direction D3, and a first auxiliary branch portion 123 branching off from the first branch portion 122 in the third direction D3.

The first stem portion 121 may include a plurality of stem portions branching off along the fourth direction D4.

In particular, the plurality of first branch portions 122 may branch off from a point of the first stem portion 121, in opposite directions or in one direction. In an alternative exemplary embodiment, the plurality of first branch portions 122 may branch off from multiple points of the first stem portion 121, in opposite directions or in one direction.

Referring to FIGS. 6 and 7, the plurality of first branch portions 122 according to the second exemplary embodiment may branch off from multiple points of the first stem portion 121 in opposite directions.

Each first auxiliary branch portion 123 may branch off from a point of the first branch portion 122 in opposite directions or one direction. Referring to FIGS. 6 and 7, each first auxiliary branch portion 123 of the second exemplary embodiment may branch off from a point of the first branch portion 122 in two opposing directions.

A second sensing electrode 320 may have a stem shape extending in the fourth direction D4.

The second sensing electrode 320 may alternatively include a plurality of sensing electrodes branching off along the third direction D3.

The plurality of first branch portions 122 and the first auxiliary branch portions 123 according to the second exemplary embodiment may be symmetric with respect to the second sensing electrode 320.

According to the second exemplary embodiment, it is depicted that the second driving electrode 120 includes the plurality of first branch portions 122 and the first auxiliary branch portions 123, while the second sensing electrode 320 has a stem shape, but exemplary embodiments are not limited thereto. In an alternative exemplary embodiment, the second driving electrode 120 may have a stem shape, and the second sensing electrode 320 may include branch portions and auxiliary branch portions.

The second driving electrode 120 and the second sensing electrode 320 may be disposed at a boundary area of the plurality of pixels PX. That is, the second driving electrode 120 and the second sensing electrode 320 may be disposed to substantially enclose each pixel PX in plan view.

For example, referring to FIG. 7, each of four pixels R-G-B-G forming one unit pixel may be substantially enclosed by the first stem portion 121, the first branch portion 122, the first auxiliary branch portion 123, and the second sensing electrode 320 in plan view.

The second driving electrode 120 may be electrically connected to a third routing wiring 125, and the second sensing electrode 320 may be electrically connected to a fourth routing wiring 325. The third routing wiring 125 and the fourth routing wiring 325 may be connected to a fingerprint recognition unit 600.

As such, the second driving electrode 120 and the second sensing electrode 320 according to the second exemplary embodiment include the first branch portion 122 branching off from the first stem portion 121, and the first auxiliary branch portions 123, such that a mutual capacitance that occurs between the second driving electrode 120 and the second sensing electrode 320 may be increased. Accordingly, sensitivity of the fingerprint recognition unit 600 may be improved.

In addition, the second driving electrode 120 and the second sensing electrode 320 according to an exemplary embodiment are disposed on a boundary area of the plurality of pixels PX in plan view, and thus a decrease in light transmittance may be minimized.

Figure 8:
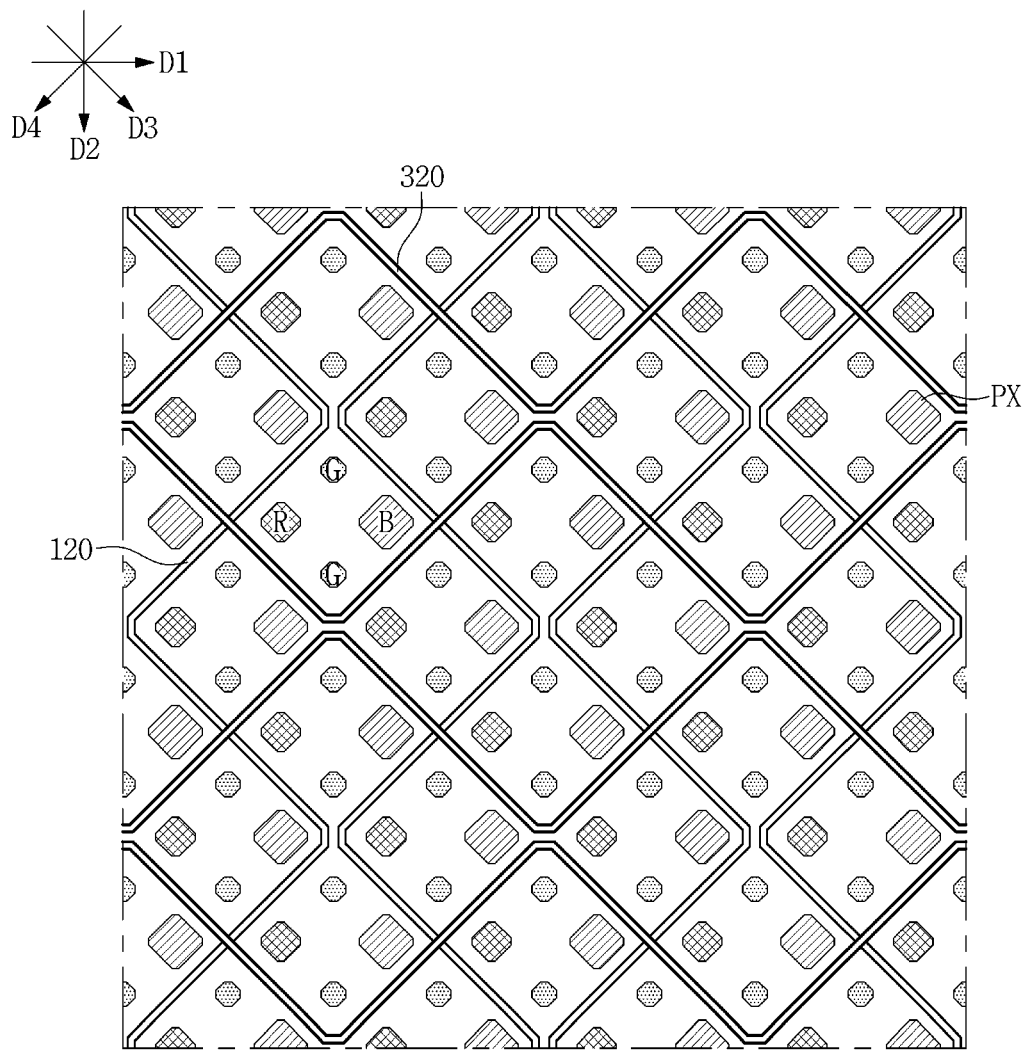
FIG. 8 is a plan view illustrating a fingerprint recognition area according to a third exemplary embodiment.

FIG. 8 is a plan view illustrating a fingerprint recognition area according to a third exemplary embodiment.

Referring to FIG. 8, a second driving electrode 120 according to the third exemplary embodiment may have a zig-zag shape extending along one direction (e.g., a second direction D2).

The second driving electrode 120 may include a plurality of driving electrodes along a first direction D1.

Adjacent ones of the second driving electrodes 120 that are adjacent to each other in the first direction D1 may be symmetric with respect to the second direction D2.

A second sensing electrode 320 may also have a zig-zag shape extending along a direction (e.g., the first direction D1) which intersects the one direction.

The second sensing electrode 320 may include a plurality of sensing electrodes along the second direction D2.

Ones of the second sensing electrode 320 that are adjacent to each other in the second direction D2 may be symmetric with respect to the first direction D1.

As illustrated in FIG. 8, the second driving electrodes 120 and the second sensing electrodes 320 may each form "X" shapes in plan view, but exemplary embodiments are not limited thereto.

The second driving electrode 120 and the second sensing electrode 320 may be disposed at a boundary area of the plurality of pixels PX. That is, the second driving electrode 120 and the second sensing electrode 320 may be disposed to substantially enclose each pixel PX in plan view.

For example, referring to FIG. 8, the second driving electrode 120 and the second sensing electrode 320 may be disposed to enclose four pixels R-G-B-G forming one unit pixel.

However, exemplary embodiments are not limited thereto, and the second driving electrode 120 and the second sensing electrode 320 may be disposed to enclose each group of four pixels R-G-B-G forming one unit pixel.

Figure 9:
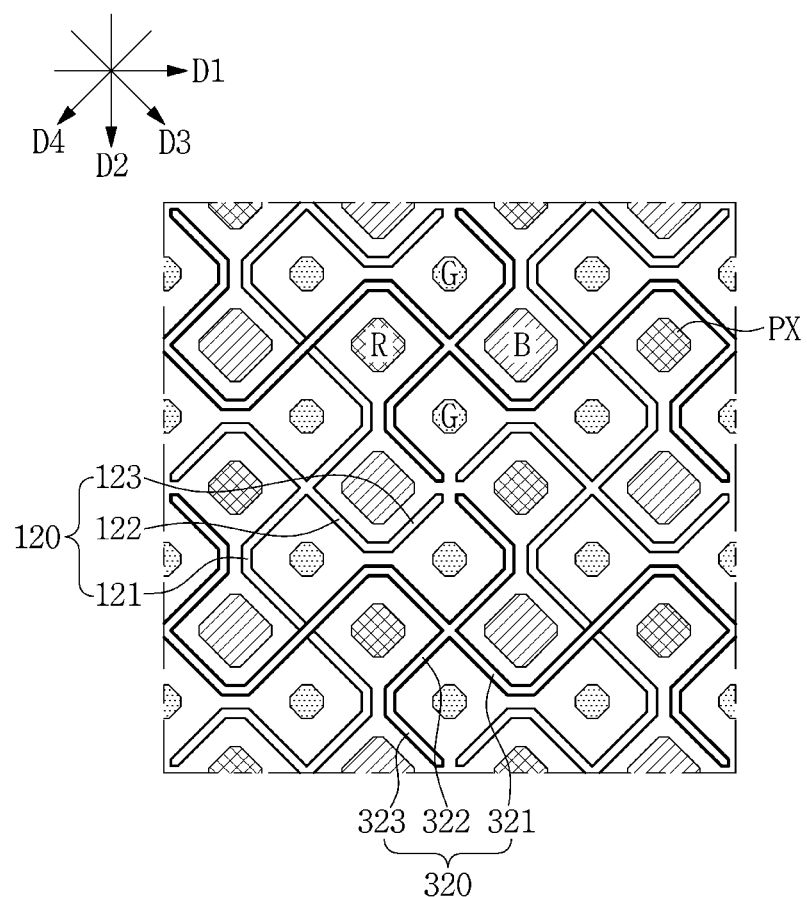
FIG. 9 is a plan view illustrating a fingerprint recognition area according to a fourth exemplary embodiment.

FIG. 9 is a plan view illustrating a fingerprint recognition area according to a fourth exemplary embodiment.

Referring to FIG. 9, a second driving electrode 120 according to the fourth exemplary embodiment may include a first stem portion 121 extending in a zig-zag manner in one direction (e.g., a second direction D2), a first branch portion 122 branching off from the first stem portion 121 in, e.g., a third direction D3, and a first auxiliary branch portion 123 bent from the first branch portion 122 in, e.g., a fourth direction D4.

A number of second driving electrodes 120 may be present, each extending in a first direction D1.

A second sensing electrode 320 may include a second stem portion 321 extending in a zig-zag pattern along one direction (e.g., the first direction D1), a second branch portion 322 branching off from the second stem portion 321 in, e.g., the fourth direction D4, and a second auxiliary branch portion 323 bent from the second branch portion 322 in, e.g., the third direction D3.

The second driving electrode 120 and the second sensing electrode 320 may form a "⊔" or swastika-like shape in plan view, but exemplary embodiments are not limited thereto.

The second driving electrode 120 and the second sensing electrode 320 may be disposed on a boundary area of the plurality of pixels PX. That is, the second driving electrode 120 and the second sensing electrode 320 may be disposed to largely enclose each pixel PX in plan view.

For example, referring to FIG. 9, the second driving electrode 120 and the second sensing electrode 320 may be disposed to enclose each group of four pixels R-G-B-G forming one unit pixel.

Figure 10:
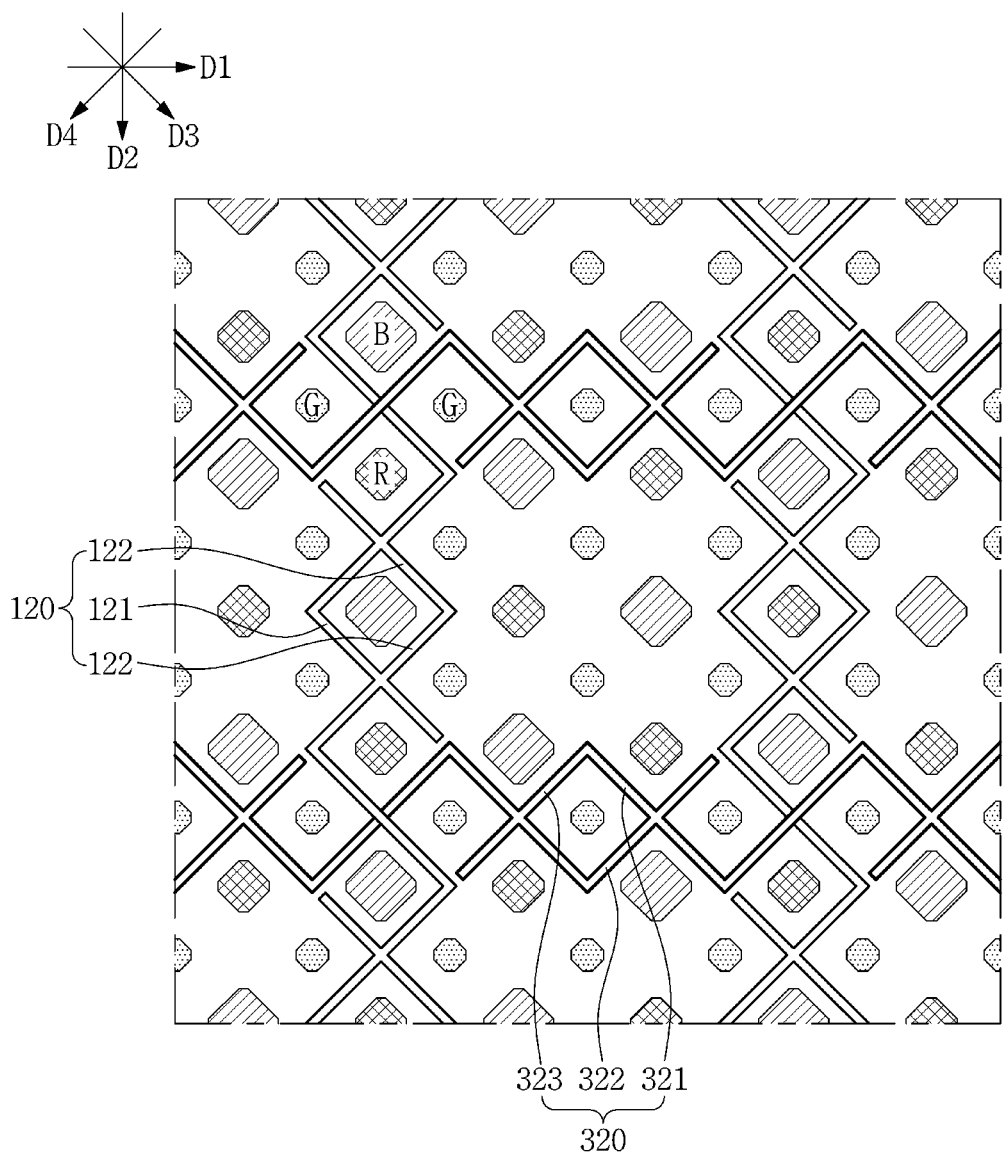
FIG. 10 is a plan view illustrating a fingerprint recognition area according to a fifth exemplary embodiment.

FIG. 10 is a plan view illustrating a fingerprint recognition area according to a fifth exemplary embodiment.

Referring to FIG. 10, a second driving electrode 120 according to the fifth exemplary embodiment may include a first stem portion 121 extending in a zig-zag shape along one direction (e.g., a second direction D2), and first branch portions 122 branching off from the first stem portion 121 in, e.g., a third direction D3 and a fourth direction D4. In such an exemplary embodiment, adjacent ones of the first branch portions 122 may be connected to one another.

The second driving electrode 120 may include a plurality of driving electrodes along a first direction D1.

A second sensing electrode 320 may include a second stem portion 321 extending in a zig-zag shape along a direction (e.g., the first direction D1), and second branch portions 322 branching off from the second stem portion 321 in, e.g., the third direction D3 and the fourth direction D4. In such an exemplary embodiment, adjacent ones of the second branch portions 322 may be connected to one another.

The second driving electrode 120 and the second sensing electrode 320 may be disposed at a boundary area of the plurality of pixels PX. That is, the second driving electrode 120 and the second sensing electrode 320 may be disposed to substantially enclose each pixel PX in plan view.

For example, referring to FIG. 10, the second driving electrode 120 and the second sensing electrode 320 may be disposed to enclose each individual one of the four pixels R-G-B-G forming one unit pixel.

Figure 11:
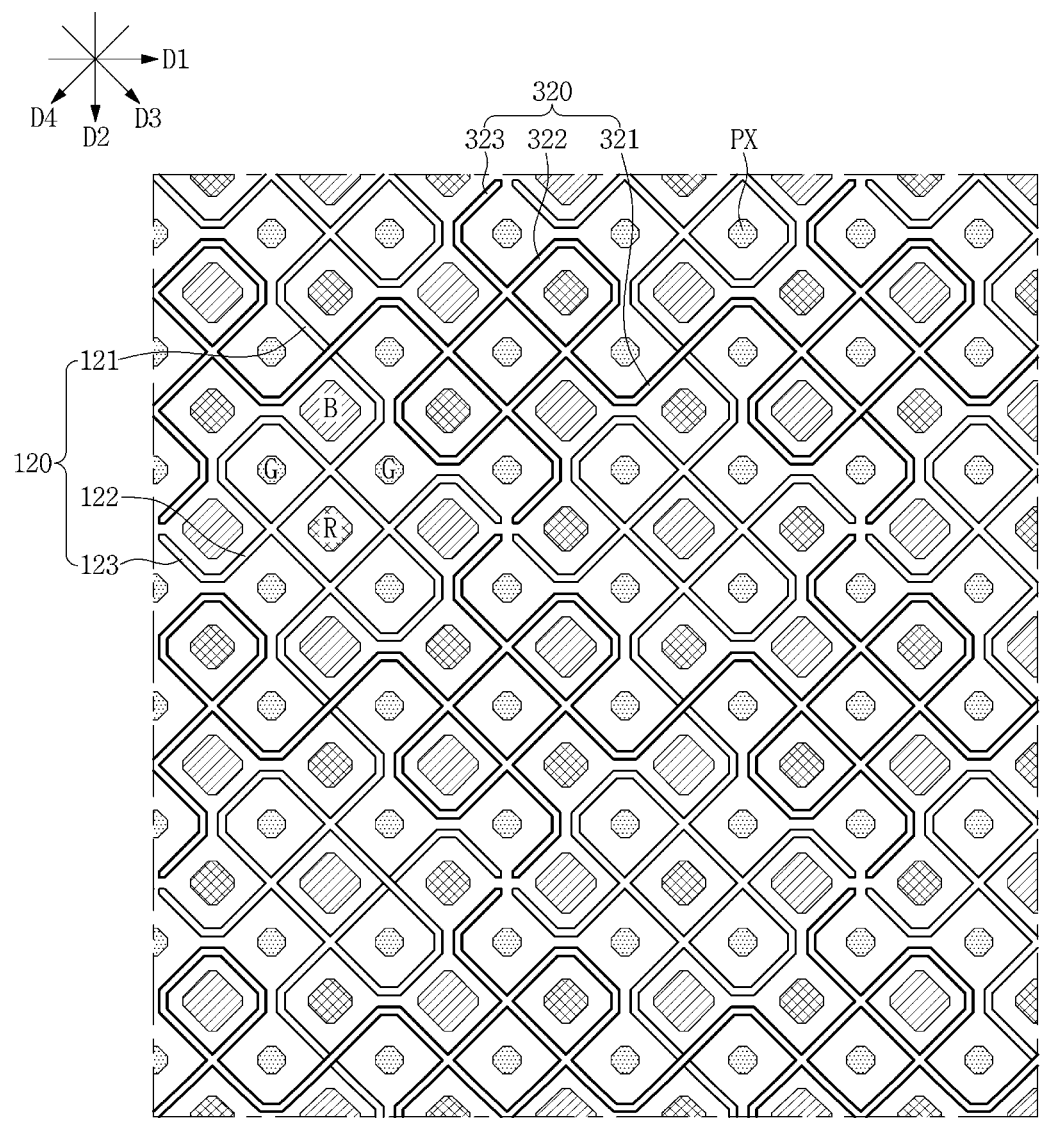
FIG. 11 is a plan view illustrating a fingerprint recognition area according to a sixth exemplary embodiment.

FIG. 11 is a plan view illustrating a fingerprint recognition area according to a sixth exemplary embodiment.

Referring to FIG. 11, a second driving electrode 120 according to the sixth exemplary embodiment may include a first stem portion 121 extending in a zig-zag shape along one direction (e.g., a second direction D2), a first branch portion 122 branching off from the first stem portion 121 in, e.g., a third direction D3 and a fourth direction D4, and a first auxiliary branch portion 123 bent from or branching off from the first branch portion 122 in, e.g., the third direction D3 and the fourth direction D4. Adjacent ones of the first branch portions 122 may be connected to one another. In addition, adjacent first branch portions 122 and first auxiliary branch portions 123 may be connected to one another. In addition, adjacent ones of the first auxiliary branch portions 123 may be connected to one another.

The second driving electrode 120 may include a plurality of driving electrodes along a first direction D1.

A second sensing electrode 320 may include a second stem portion 321 extending in a zig-zag shape along a direction (e.g., the first direction D1), a second branch portion 322 branching off from the second stem portion 321 in, e.g., a third direction D3 and a fourth direction D4, and a second auxiliary branch portion 323 bent from or branching off from the second branch portion 322 in, e.g., the third direction D3 and the fourth direction D4. Adjacent ones of the second branch portions 322 may be connected to one another. In addition, adjacent second branch portions 322 and second auxiliary branch portions 323 may be connected to one another. In addition, adjacent ones of the second auxiliary branch portions 323 may be connected to one another.

The second driving electrode 120 and the second sensing electrode 320 may be disposed at a boundary area of the plurality of pixels PX. That is, the second driving electrode 120 and the second sensing electrode 320 may together be disposed to substantially enclose each pixel PX in plan view.

For example, referring to FIG. 11, the second driving electrode 120 and the second sensing electrode 320 may be disposed to enclose each of the four pixels R-G-B-G forming one unit pixel.

Figure 12:
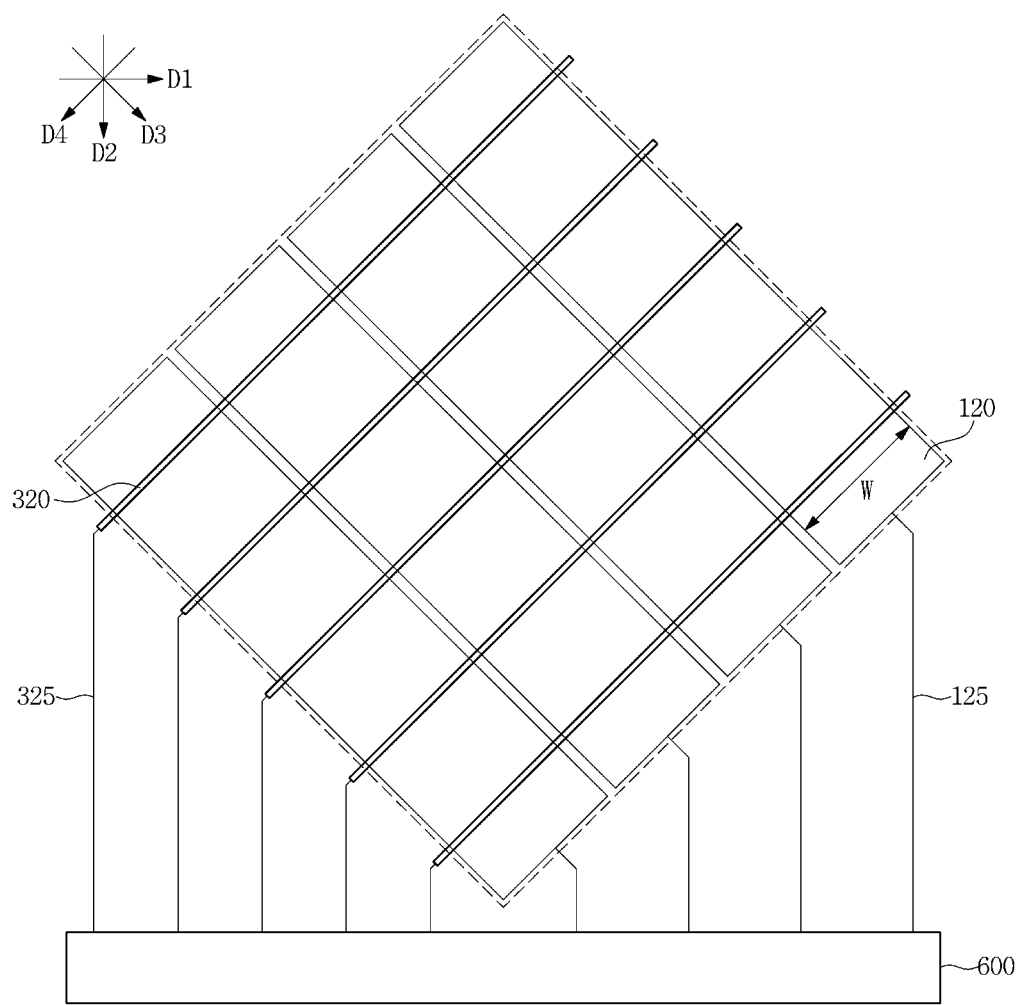
FIG. 12 is a plan view illustrating a fingerprint recognition area according to a seventh exemplary embodiment.

FIG. 12 is a plan view illustrating a fingerprint recognition area according to a seventh exemplary embodiment.

Referring to FIG. 12, a second driving electrode 120 according to the seventh exemplary embodiment may be a planar or flat platelike electrode extending in one direction (e.g., a third direction D3).

The second driving electrode 120 may have a width W ranging from about several tens of micrometers (μm) to about several hundreds of micrometers.

A second sensing electrode 320 may have a stem shape extending in a direction (e.g., a fourth direction D4) which intersects the major axis of the second driving electrode 120. The second sensing electrode 320 may have a line width ranging from about several micrometers to about several tens of micrometers.

The second driving electrode 120 may include transparent conductive oxide (TCO). The TCO may include at least one of: indium tin oxide (ITO), indium zinc oxide (IZO), zinc oxide (ZnO), carbon nanotube (CNT), and graphene.

The second driving electrode 120 may be electrically connected to a third routing wiring 125, and the second sensing electrode 320 may be electrically connected to a fourth routing wiring 325. The third routing wiring 125 and the fourth routing wiring 325 may be connected to a fingerprint recognition unit 600.

According to the seventh exemplary embodiment, it is illustrated that the second driving electrode 120 has a planar or flat platelike electrode shape, and the second sensing electrode 320 has a stem or line shape, but exemplary embodiments are not limited thereto. In an alternative exemplary embodiment, the second driving electrode 120 may have a stem shape, and the second sensing electrode 320 may have a planar electrode shape.

Figure 13:
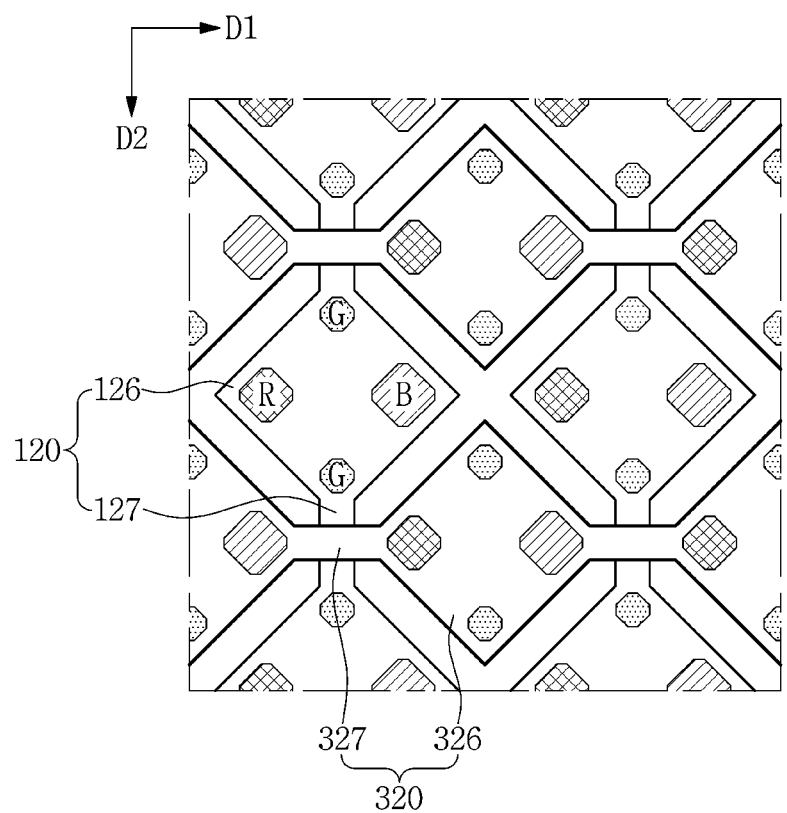
FIG. 13 is a plan view illustrating a fingerprint recognition area according to an eighth exemplary embodiment.
Figure 14:
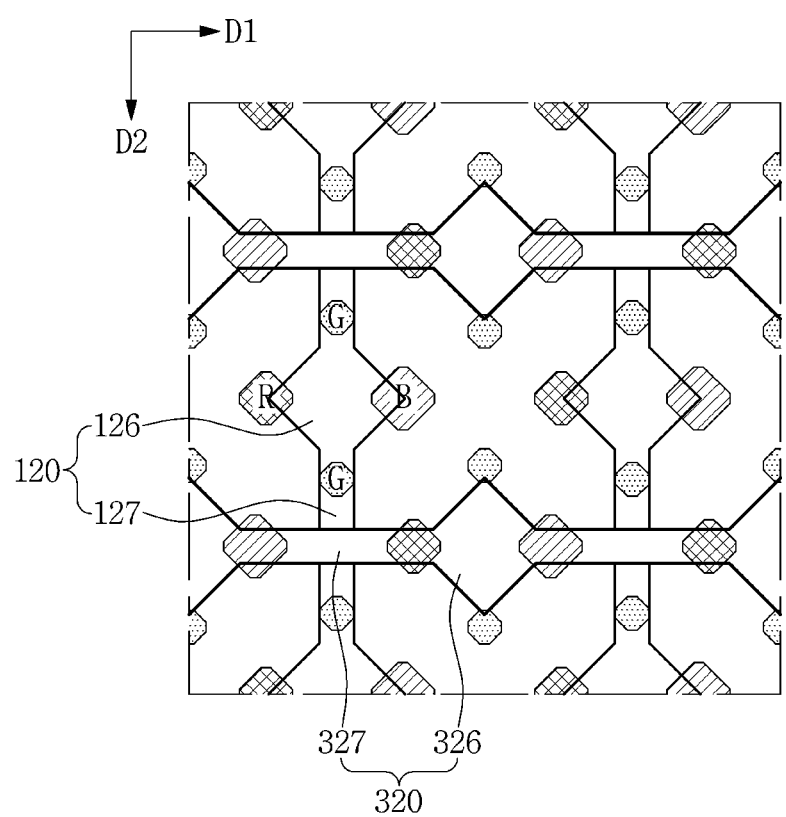
FIG. 14 is a plan view illustrating a fingerprint recognition area according to a ninth exemplary embodiment.

FIG. 13 is a plan view illustrating a fingerprint recognition area according to an eighth exemplary embodiment, and FIG. 14 is a plan view illustrating a fingerprint recognition area according to a ninth exemplary embodiment.

Referring to FIGS. 13 and 14, a second driving electrode 120 according to the eighth and ninth exemplary embodiments may include a plurality of first unit electrodes 126 disposed successively along one direction (e.g., a second direction D2) and a first connecting wiring 127 connecting adjacent ones of the first unit electrodes 126.

In addition, a second sensing electrode 320 may include a plurality of second unit electrodes 326 disposed successively along a direction (e.g., a first direction D1) which intersects the one direction, and a second connecting wiring 327 connecting adjacent ones of the second unit electrodes 326.

The first unit electrodes 126 and the second unit electrodes 326 may be disposed not to overlap each other in plan view. The first connecting wiring 127 and the second connecting wiring 327 may be insulated from and intersect one another in plan view.

The first unit electrodes 126 and the second unit electrodes 326 may each have an area ranging from about several tens of square micrometers ($\mu m^2$) to about several hundreds of square micrometers.

Each of the first unit electrode 126 and the second unit electrode 326 may have a size corresponding to a size of four pixels R-G-B-G forming one unit pixel (refer to FIG. 13), or may have a less size than a size of four pixels R-G-B-G forming one unit pixel (refer to FIG. 14).

The second driving electrode 120 and the second sensing electrode 320 may include transparent conductive oxide (TCO). The TCO may include at least one selected from the group consisting of: indium tin oxide (ITO), indium zinc oxide (IZO), zinc oxide (ZnO), carbon nanotube (CNT), and graphene.

Referring to FIGS. 13 and 14, the second driving electrode 120 and the second sensing electrode 320 are depicted as each including planar electrodes having a lozenge shape, but exemplary embodiments are not limited thereto. In an alternative exemplary embodiment, the second driving electrode 120 and the second sensing electrode 320 may have a triangular shape, a quadrangular shape, or a mesh electrode shape.

Figure 15:
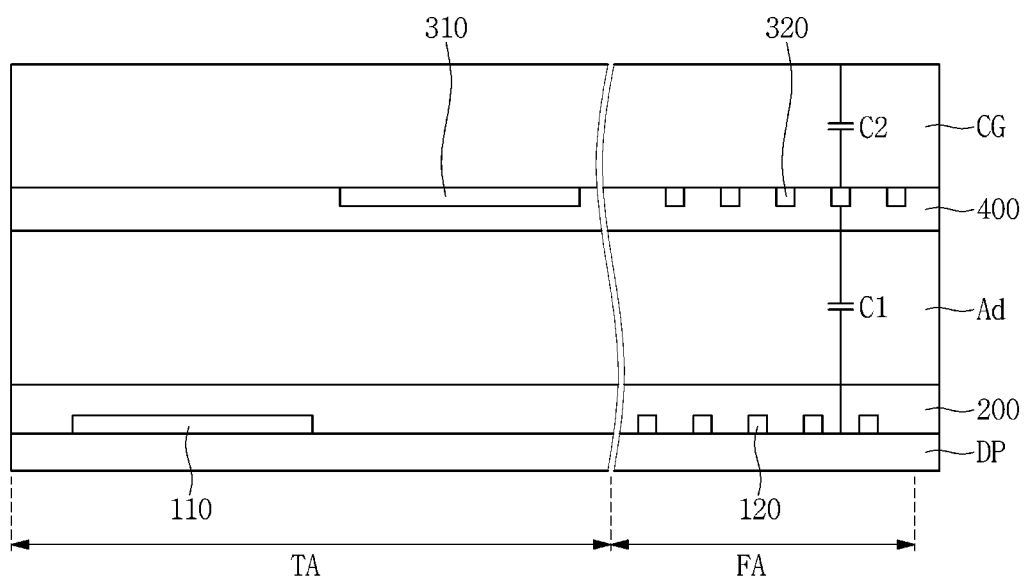
FIG. 15 is a cross-sectional view illustrating a display device according to a tenth exemplary embodiment.

FIG. 15 is a cross-sectional view illustrating a display device according to a tenth exemplary embodiment.

Referring to FIG. 15, the display device according to the tenth exemplary embodiment may include a display panel DP, a plurality of first driving electrodes 110 on the display panel DP in a touch recognition area TA, a plurality of second driving electrodes 120 on the display panel DP in a fingerprint recognition area FA, a first insulating layer 200 on the display panel DP and covering the first driving electrode 110 and the second driving electrode 120, an adhesion layer Ad on the first insulating layer 200, a second insulating layer 400 on the adhesion layer Ad, a plurality of first sensing electrodes 310 on the second insulating layer 400 in the touch recognition area TA, a plurality of second sensing electrodes 320 on the second insulating layer 400 in the fingerprint recognition area FA, and a cover glass CG on the first sensing electrode 310 and the second sensing electrode 320.

The display device according to the tenth exemplary embodiment may be provided by: forming the first driving electrode 110, the second driving electrode 120, and the first insulating layer 200 on the display panel DP; forming the first sensing electrode 310, the second sensing electrode 320, and the second insulating layer 400 on the cover glass CG; and then attaching the display panel DP and the cover glass CG to each other.

In the display device according to the tenth exemplary embodiment, the adhesion layer Ad is disposed between the display panel DP and the second sensing electrode 320, such that a first capacitance C1 between the display panel DP and the second sensing electrode 320 may decrease and a second capacitance C2 between the second sensing electrode 320 and a finger may increase.

As such, in the display device according to the tenth exemplary embodiment, a stack structure of the second driving electrode 120 and the second sensing electrode 320 in the fingerprint recognition area FA is modified such that sensitivity of a fingerprint recognition unit may be improved.

As set forth hereinabove, in one or more exemplary embodiments of a touch panel and a display device including the touch panel, a fingerprint recognition sensor is not separately provided, but the fingerprint recognition sensor is provided on substantially a same layer as a layer on which the touch panel is disposed and, in plan view, in a different area from an area in which the touch panel is disposed, such that a thickness of the display device may be reduced.

Further, in one or more exemplary embodiments of the touch panel and the display device including the touch panel, a shape and a stack structure of a driving electrode and a sensing electrode in a fingerprint recognition area are modified such that sensitivity of a fingerprint recognition unit may be improved.

Further, in one or more exemplary embodiments of the touch panel and the display device including the touch panel, the driving electrode and the sensing electrode in the fingerprint recognition area do not overlap, in plan view, a plurality of pixels in the fingerprint recognition area, such that a decrease in light transmittance may be minimized.

While the present invention has been shown and described with reference to the exemplary embodiments thereof, it will be apparent to those of ordinary skill in the art that various changes in form and detail may be made thereto without departing from the spirit and scope of the present invention. Various features of the above described and other embodiments can be mixed and matched in any manner, to produce further embodiments consistent with the invention.

What is claimed is:

1. A touch panel comprising:
    a substrate comprising a touch recognition area and a fingerprint recognition area;
    a first driving electrode and a first sensing electrode insulated from each other on the substrate and each positioned in the touch recognition area; and
    a second driving electrode and a second sensing electrode insulated from each other on the substrate and each positioned in the fingerprint recognition area,
    wherein at least one of the second driving electrode and the second sensing electrode comprises:
        a stem portion extending in a first direction; and
        a plurality of branch portions directly connected to and branching off from the stem portion in a second direction and a third direction opposite to the second direction, in the same layer.

2. The touch panel as claimed in claim 1, further comprising an auxiliary branch portion branching off from the branch portion.

3. The touch panel as claimed in claim 1, wherein the stem portion has a zig-zag shape.

4. The touch panel as claimed in claim 3, wherein the second driving electrode and the second sensing electrode further comprise an auxiliary branch portion bent from the branch portion to extend therefrom.

5. The touch panel as claimed in claim 1, wherein the second driving electrode and the second sensing electrode each have a zig-zag shape.

6. The touch panel as claimed in claim 1, wherein adjacent ones of the branch portions are connected to one another.

7. The touch panel as claimed in claim 1, wherein an area of the fingerprint recognition area is substantially an integer multiple of an area of the first driving electrode or an area of the first sensing electrode.

8. The touch panel as claimed in claim 1, wherein the first driving electrode or the first sensing electrode has an area having a magnitude from about several square millimeters ($mm^2$) to about several tens of square millimeters.

9. The touch panel as claimed in claim 8, wherein the second driving electrode and the second sensing electrode have a pitch having a magnitude from about several micrometers ($\mu m$) to about several tens of micrometers.

10. The touch panel as claimed in claim 1, further comprising:
    a first routing wiring connected to the first driving electrode;
    a second routing wiring connected to the first sensing electrode; and
    a touch driving unit connected to the first routing wiring and the second routing wiring.

11. The touch panel as claimed in claim 10, further comprising:
    a third routing wiring connected to the second driving electrode;
    a fourth routing wiring connected to the second sensing electrode; and
    a fingerprint recognition unit connected to the third routing wiring and the fourth routing wiring.

12. The touch panel as claimed in claim 11, wherein the touch driving unit and the fingerprint recognition unit oppose each other.

13. The touch panel as claimed in claim 1, wherein the stem portion and the branch portion have an included angle that is an angle between about 80 degrees and about 100 degrees.

14. The touch panel as claimed in claim 2, wherein the branch portion and the auxiliary branch portion have an included angle that is an angle between about 80 degrees and about 100 degrees.

15. The touch panel as claimed in claim 2, wherein the auxiliary branch portion is substantially parallel to the stem portion.

16. The touch panel as claimed in claim 1, wherein the fingerprint recognition area is positioned at a central portion of at least one edge portion of the substrate.

17. A touch panel comprising:
    a substrate comprising a touch recognition area and a fingerprint recognition area;
    a first driving electrode and a first sensing electrode insulated from each other on the substrate and each positioned in the touch recognition area; and
    a second driving electrode and a second sensing electrode insulated from each other on the substrate and each positioned in the fingerprint recognition area,
    wherein the second driving electrode and the second sensing electrode comprise:
        a plurality of unit electrodes, wherein each of the plurality of unit electrodes overlaps with four pixels forming one unit pixel in plan view; and
        a connecting wiring connecting the unit electrodes.

18. The touch panel as claimed in claim 17, wherein the unit electrodes have shapes each selected from: a triangular shape, a quadrangular shape, and a lozenge shape.

19. The touch panel as claimed in claim 17, wherein the first driving electrode or the first sensing electrode has an area having a magnitude from about several square millimeters ($mm^2$) to about several tens of square millimeters.

20. The touch panel as claimed in claim 19, wherein the unit electrode has an area having a magnitude from about several tens of square micrometers ($\mu m^2$) to about several hundreds of square micrometers.

21. A display device comprising:
a display panel comprising a plurality of pixels configured to display an image; and
a touch panel on the display panel,
wherein the touch panel comprises:
    a first driving electrode and a first sensing electrode insulated from each other on the display panel and each positioned in a touch recognition area; and
    a second driving electrode and a second sensing electrode insulated from each other on the display panel and each positioned in a fingerprint recognition area,
wherein at least one of the second driving electrode and the second sensing electrode comprises:
    a stem portion extending in a first direction; and
    a plurality of branch portions directly connected to and branching off from the stem portion in a second direction and a third direction opposite to the second direction in the same layer, and
wherein the second driving electrode and the second sensing electrode are disposed proximate to a boundary of the plurality of pixels.

22. The display device as claimed in claim 21, further comprising an auxiliary branch portion branching off from the branch portion.

23. The display device as claimed in claim 21, wherein the stem portion has a zig-zag shape.

24. The display device as claimed in claim 21, wherein the second driving electrode and the second sensing electrode further comprise an auxiliary branch portion bent from the branch portion to extend therefrom.

25. The display device as claimed in claim 21, wherein the second driving electrode and the second sensing electrode have a zig-zag shape.

26. The display device as claimed in claim 21, wherein adjacent ones of the branch portions are connected to one another.

27. A display device comprising:
a display panel comprising a plurality of pixels displaying an image; and
a touch panel on the display panel,
wherein the touch panel comprises:
    a first driving electrode on the display panel and positioned in a touch recognition area;
    a second driving electrode on the display panel and positioned in a fingerprint recognition area;
    a first insulating layer on the first driving electrode and the second driving electrode, and covering the first driving electrode and the second driving electrode;
    an adhesion layer on the first insulating layer;
    a second insulating layer on the adhesion layer;
    a first sensing electrode on the second insulating layer and positioned in the touch recognition area;
    a second sensing electrode on the second insulating layer and positioned in the fingerprint recognition area; and
    a cover glass on the first sensing electrode and the second sensing electrode,
wherein at least one of the second driving electrode and the second sensing electrode comprises:
    a stem portion; and
    a branch portion directly connected to and branching off from the stem portion, and
wherein the second driving electrode and the second sensing electrode are disposed proximate to a boundary of the plurality of pixels.

28. A touch panel comprising:
a substrate comprising a touch recognition area and a fingerprint recognition area;
a first driving electrode and a first sensing electrode insulated from each other on the substrate and each positioned in the touch recognition area; and
a second driving electrode and a second sensing electrode insulated from each other on the substrate and each positioned in the fingerprint recognition area, and
wherein the second driving electrode has a zig-zag shape that extends across the fingerprint recognition area in a first direction and the second sensing electrode has a zig-zag shape that extends across the fingerprint recognition area in a second direction that intersects the first direction.

29. A touch panel comprising:
a substrate comprising a touch recognition area and a fingerprint recognition area;
a first driving electrode and a first sensing electrode insulated from each other on the substrate and each positioned in the touch recognition area, with the first driving electrode extending in a first direction and the first sensing electrode extending in a second direction that is perpendicular to the first direction; and
a second driving electrode and a second sensing electrode insulated from each other on the substrate and each positioned in the fingerprint recognition area, wherein the second driving electrode extends in a third direction different from the first direction and the second direction and the second sensing electrode extends in a fourth direction different from the first direction and the second direction;
wherein one of the second driving electrode and the second sensing electrode has a planar shape extending across the fingerprint recognition area along the third or fourth direction and having a width ranging from about several tens of micrometers to about several hundreds of micrometers, and
wherein the other one of the second driving electrode and the second sensing electrode has a stem shape extending across the fingerprint recognition area along the third or fourth direction having a width ranging from about several micrometers to about several tens of micrometers.

* * * * *